United States Patent
Hossain (10) Patent No.: US 12,453,799 B1
(45) Date of Patent: Oct. 28, 2025

(54) BIOADHESIVE FOR MEDICAL AND DENTAL APPLICATIONS

(71) Applicant: IMAM MOHAMMAD IBN SAUD ISLAMIC UNIVERSITY, Riyadh (SA)

(72) Inventor: Abm Sharif Hossain, Riyadh (SA)

(73) Assignee: IMAM MOHAMMAD IBN SAUD ISLAMIC UNIVERSITY, Riyadh (SA)

( * ) Notice: Subject to any disclaimer, the term of this patent is extended or adjusted under 35 U.S.C. 154(b) by 0 days.

(21) Appl. No.: 19/039,751

(22) Filed: Jan. 28, 2025

(51) Int. Cl.
*A61L 24/00* (2006.01)
*A61L 24/04* (2006.01)
*A61L 24/08* (2006.01)

(52) U.S. Cl.
CPC ....... *A61L 24/0005* (2013.01); *A61L 24/0031* (2013.01); *A61L 24/0094* (2013.01); *A61L 24/046* (2013.01); *A61L 24/08* (2013.01)

(58) Field of Classification Search
CPC .. A61L 24/0005; A61L 24/0031; A61L 24/08; A61L 24/046; A61L 24/0094
See application file for complete search history.

(56) References Cited

U.S. PATENT DOCUMENTS

| | | |
|---|---|---|
| 7,255,874 B1 | 8/2007 | Bobo et al. |
| 12,099,291 B1 | 9/2024 | Hossain et al. |
| 2004/0018228 A1 | 1/2004 | Fischell et al. |

FOREIGN PATENT DOCUMENTS

| | | |
|---|---|---|
| CN | 105477677 A | 4/2016 |
| EP | 2 013 237 B1 | 12/2015 |
| WO | 2007/138135 A1 | 12/2007 |

OTHER PUBLICATIONS

Hizam et al. (International J. Biology Macromolecules 193 (2021) 2006-2020).*
Ceballos-Vazquez et al. (Biointerface Research in Applied Chemistry 14(30 2024, 57, 1-14).*
Bhushan Hajare, et al. "Review on conversion of jackfruit (Artocarpus heterophyllus) waste for making value added polymers", Biomass Conversion and Biorefinery, vol. 14, May 26, 2023, pp. 23245-23257.

* cited by examiner

*Primary Examiner* — Shirley V Gembeh
(74) *Attorney, Agent, or Firm* — Oblon, McClelland, Maier & Neustadt, L.L.P.

(57) ABSTRACT

A bioadhesive and a method of its preparation. The bioadhesive includes a cyanoacrylate polymer, a starch mixture including *Moringa oleifera* starch and acid hydrolyzed date seed starch. The bioadhesive further includes a plant latex, a natural gum, a plant-derived hydrogel, glycerin, a dye, an organic solvent, and bone powder.

17 Claims, 5 Drawing Sheets

BIOADHESIVE FOR MEDICAL AND DENTAL APPLICATIONS

BACKGROUND

Technical Field

The present disclosure is related to a bioadhesive for use in medical and dental fields, and a method of production thereof.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

Biodegradable polymers, both synthetic and natural, are increasingly used as sustainable alternatives to petroleum-based plastics in various fields, including medicine. Adhesive biomaterials have emerged as essential tool in medical and surgical applications. These materials are particularly useful for sealing and repairing tissues in organs that undergo dynamic shape changes, such as the lungs, heart, and bladder. However, there are certain challenges in the use of biodegradable polymers. The challenges may be due to the continuous movement of such organs and wet environment, which complicate effective adhesion. An ideal bioadhesive should possess strong adhesive properties to bind securely to wet tissue surfaces and exhibit flexibility and durability to withstand cyclic mechanical stresses.

In addition, an adhesive should be sufficient strength and toughness to be able to effectively bond multiple types of tissues. For example, it would be desirable to bond bone to bone, bone to connective tissue such as tendon, muscle to muscle, muscle to connective tissue such as ligament, etc. These different types of tissues typically need to withstand different types and magnitudes of mechanical stresses. Having an adhesive compatible with multiple types of tissues would be hugely advantageous.

Despite advancements in adhesive technology, many existing bioadhesives fall short of surgical requirements. In addition, synthetic adhesives may lack biocompatibility and may trigger adverse tissue and immune system reactions or show toxicity. Furthermore, synthetic adhesives may not degrade naturally, leading to long-term complications or requiring surgical intervention. In contrast, conventional adhesives derived from organic sources may fail to provide the required mechanical strength or elasticity to cope with the repetitive motion of dynamic tissues. The limitations underscore the critical need for innovative bioadhesive formulations to combine biocompatibility, biodegradability, and enhanced mechanical adaptability for effective use in dynamic tissue applications.

Bioadhesive matrices are increasingly replacing sutures and staples in surgery due to the ability to speed up procedures, provide complete closure, reduce patient pain, minimize scarring, lower infection risks, and eliminate the need for sharp instruments. Bioadhesive effectively seal air and fluid leaks, repair tissues resistant to sutures, and support both internal and external fixation in various medical applications. Bioadhesive are designed to be biocompatible, biodegradable, and to exhibit rapid curing, optimal bond strength, and elasticity. A bioadhesive may have optimal viscosity for easy application, remain in place, and solidify quickly without disrupting tissue healing, and must also bond effectively to wet tissues without causing toxicity or impeding the natural healing process.

Organic biodegradable nanocomposite adhesives provide a sustainable alternative to synthetic adhesives for tissue joining, promoting proliferation and development in medical and dental surgeries. Organic biodegradable nanocomposites may enhance healing while being eco-friendly and biocompatible. Organic adhesives support tissue repair and proliferation, reducing the risks and costs associated with repeated surgeries or failure due to reliance on stitches or screws alone. By enhancing healing and supporting tissue contraction, organic adhesives present an eco-friendly solution ideal for surgical applications. Further, by addressing both minor and complex tissue damage, bioadhesive are particularly beneficial for delicate areas such as bones, cartilage, skin, and muscle. The recent shift toward bio-based nanocomposite adhesives, derived from organic plant and animal sources, represents a significant advancement in the field. Innovations in organic adhesives offer sustainable, biocompatible alternatives, which not only enhance healing but also overcome the limitations of traditional synthetic adhesives, paving the way for more effective and environmentally friendly medical applications.

Accordingly, one object of the present disclosure is to provide a bioadhesive composition derived from organic sources that may circumvent the drawbacks and limitations of materials known in the art, such as poor biocompatibility, poor biodegradability, toxicity, and inadequate bonding to moist or active tissue surfaces.

SUMMARY

According to a first aspect, the present disclosure relates to a bioadhesive. In some embodiments, the bioadhesive includes a cyanoacrylate polymer, a starch mixture including *Moringa oleifera* starch and acid hydrolyzed date seed starch. In some embodiments, the bioadhesive further includes a plant latex, a natural gum, a plant-derived hydrogel, glycerin, a dye, an organic solvent, and bone powder.

In some embodiments, the starch further includes at least selected from the group including potato starch, corn starch, and arrowroot starch.

In some embodiments, the starch further includes potato starch, corn starch, and arrowroot starch.

In some embodiments, the plant hydrogel includes okra hydrogel and *Moringa* olifera hydrogel.

In some embodiments, the dye includes beetroot dye and blueberry dye.

In some embodiments, the bone powder is beef bonemeal powder.

In some embodiments, the glycerin is sheep-derived glycerin.

In some embodiments, the plant latex is jackfruit latex.

In some embodiments, the organic solvent is ethanol.

In some embodiments, the natural gum is *Acacia arabica* gum.

In some embodiments, the starch is present in an amount of 25 percent by weight (wt. %) to 45 wt. % based on a total weight of bioadhesive.

In some embodiments, the starch is present as particles having a mean particle size of 5 nanometers (nm) to 25 nm.

In some embodiments, the bioadhesive having a viscosity of 15 centistokes (cSt) to 35 cSt and a pH of 7.25 to 8.75.

In some embodiments, the bioadhesive having an anthocyanine content of 75 milligrams (mg) to 135 mg per 100 grams (g) of bioadhesive.

The present disclosure also relates to a method of forming the bioadhesive. The method includes pyrolyzing date seeds and *Moringa* olifera seed coats at 100° C. to 175° C. for 1 to 8 hours to form a pyrolyzed product. The method further includes treating the pyrolyzed product with a concentrated mineral acid to form a hydrolyzed product and mixing the hydrolyzed product with the cyanoacrylate polymer, the plant latex, the natural gum, glycerin, the dye, the organic solvent, and bone powder used to form the bioadhesive.

In some embodiments, the concentrated mineral acid is concentrated hydrochloric acid (HCl).

In some embodiments, the mixing further includes adding at least one additional starch selected from the group consisting of potato starch, corn starch, and arrowroot starch, and okra hydrogel.

In yet another exemplary embodiment, a method of repairing a tissue is described. The method includes applying to a wound in the tissue the bioadhesive described above.

In some embodiments, the wound is at least one selected from a cut, a tear, and a fracture.

In some embodiments, the tissue is at least one selected from bone and muscle.

The foregoing general description of the illustrative embodiments and the following detailed description thereof are merely exemplary aspects of the teachings of this disclosure and are not restrictive.

BRIEF DESCRIPTION OF DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

As used herein, the term "bioadhesive" refers to a process or material designed to bond biologically with tissues, surfaces, or other substrates, typically used in medical, pharmaceutical, or industrial applications for wound healing, tissue repair, or other bonding purposes.

As used herein, the term "pyrolyzing" refers to a process of decomposing organic materials through the application of heat in the absence of oxygen, resulting in the production of gases, liquids, and solid residues, typically used in material modification or energy production.

As used herein, the term "viscosity" refers to a property of a fluid that measures its resistance to flow, which is influenced by factors such as temperature and composition, and is crucial for determining the fluid's ability to spread, adhere, or move in various applications.

As used herein, the term "wound" refers to a process of injury or damage to the body's tissues, typically resulting in a break in the skin or underlying tissues, which requires healing or treatment to restore function and integrity.

As used herein, the term "tissue" refers to a process of organized cell structures working together to perform specific functions within the body, typically including groups of cells such as epithelial, connective, muscle, and nervous tissues, which support the structure and function of organs and systems.

The present disclosure may be advantageous for providing a method of forming a bioadhesive from biological sources. The use of such biological sources may be advantageous for making the bioadhesive or method more eco-friendly, more biocompatible, less costly, or some combination of these. The bioadhesive of the present disclosure can enhance medical, industrial, and environmental applications by offering improved bonding properties and versatility.

According to a first aspect, the present disclosure relates to a bioadhesive. In some embodiments, the bioadhesive includes a cyanoacrylate polymer, a starch including *Moringa* olifera starch and acid hydrolyzed date seed starch, a plant latex, a natural gum, a plant hydrogel, glycerin, a dye, an organic solvent, and bone powder.

In general, the cyanoacrylate polymer can include or be formed of a suitable monomer that contains a cyanoacrylate moiety or a suitable derivative thereof such as a cyanoacrylate ester. Examples of monomers which may be included in or form the cyanoacrylate polymer include, but are not limited to 2-methoxyethyl 2-cyanoacrylate, 2-ethoxyethyl 2-cyanoacrylate, ethyl 2-cyanoacrylate, n-propyl 2-cyanoacrylate, iso-propyl 2-cyanoacrylate, n-butyl 2-cyanoacrylate, sec-butyl 2-cyanoacrylate, iso-butyl 2-cyanoacrylate, tert-butyl 2-cyanoacrylate, n-pentyl 2-cyanoacrylate, neo-pentyl 2-cyanoacrylate, 1-ethylpropyl 2-cyanoacrylate, 1-methylbutyl 2-cyanoacrylate, n-hexyl 2-cyanoacrylate, n-heptyl 2-cyanoacrylate, n-octyl 2-cyanoacrylate, 2-octyl 2-cyanoacrylate, 2-ethylhexyl 2-cyanoacrylate, tetrahydrofurfuryl 2-cyanoacrylate, and mixtures thereof.

In some embodiments, the cyanoacrylate polymer may be present in the bioadhesive in an amount of 1 to 10 wt. %, based on a total weight of bioadhesive. For example, the cyanoacrylate polymer may be present in an amount of 1.0 wt. %, 1.25 wt. %, 1.5 wt. %, 1.75 wt. %, 2.0 wt. %, 2.25 wt. %, 2.5 wt. %, 2.75 wt. %, 3.0 wt. %, 3.25 wt. %, 3.5 wt. %, 3.75 wt. %, 4.0 wt. %, 4.25 wt. %, 4.5 wt. %, 4.75 wt. %, 5.0 wt. %, 5.25 wt. %, 5.5 wt. %, 5.75 wt. %, 6.0 wt. %, 6.25 wt. %, 6.5 wt. %, 6.75 wt. %, 7.0 wt. %, 7.25 wt. %, 7.5 wt. %, 7.75 wt. %, 8.0 wt. %, 8.25 wt. %, 8.5 wt. %, 8.75 wt. %, 9.0 wt. %, 9.25 wt. %, 9.5 wt. %, 9.75 wt. %, or 10.0 wt %.

Starch is a polysaccharide (biopolymer). Typically, starch includes amylose and amylopectin. Amylose is a linear polymer of glucose molecules bound to each other through glycosidic bonds. Amylopectin is a branched polymer of glucose molecules. Typically, starch includes about 65 to 85 wt. % amylopectin and about 15 to 35 wt. % amylose, however, the amounts of amylose and amylopectin can depend on the starch source. Some starch sources contain little to no amylopectin while other starch sources contain almost exclusively amylopectin. Different forms of starch may be used. For example, starch derived from corn, tapioca, arrowroot, sago palm (*Metroxylon sagu*), wheat, rice, potato, cassava, barley, oat, rye, sorghum, millet, yam, sweet potato, lentil, chickpea, mung bean, pea, *quinoa*, amaranth, banana, breadfruit, lotus root, kudzu, *canna*, chestnut, triticale, buckwheat, acorn, plantain, water chestnut starch, *Moringa* olifera, date seed, Nigella *sativa* (black cumin seed), and/or combinations thereof. In some embodiments, the starch includes potato starch. In some embodiments, the starch includes *Moringa* olifera starch. In some embodiments, the starch includes date seed starch. In some embodiments, the starch includes *Moringa* olifera starch and date seed starch. In some embodiments, the starch includes corn starch. In some embodiments, the starch includes arrowroot starch. In some embodiments, the starch includes potato starch, corn starch, and arrowroot starch. In some embodiments, the starch includes *Moringa* olifera starch and date seed starch and further includes at least one of potato starch, corn starch, and arrowroot starch. In some embodiments, the starch includes *Moringa* olifera starch, date seed starch, potato starch, corn starch, and arrowroot starch.

In some embodiments, the starch is a natural (unmodified starch). In some embodiments, the starch is a modified starch. Examples of modified starches include, but are not limited to dextrin, acid-treated starch, alkaline-treated starch, bleached starch, oxidized starch, enzyme-treated starch, monostarch phosphate, distarch phosphate, phosphated distarch phosphate, acetylated distarch phosphate, starch acetate, acetylated distarch adipate, hydroxypropyl starch, hydroxypropyl distarch phosphate, hydroxypropyl distarch glycerol, starch sodium octenyl succinate, acetylated oxidized starch. In some embodiment, the starch may be used in the form of powder. The starch is preferably functionalized with an alkyl or aryl alkyl xanthate, most preferably a secondary or tertiary alkyl xanthate such as isopropyl, isobutyl, isopentyl, neopentyl, neophyl or tertiary butyl xanthate. In some embodiments, the date seed starch is an acid hydrolyzed (also referred to as acid treated) date seed starch.

In some embodiments, the starch is present in an amount ranging from 25 to 45 wt. %, based on the total weight of the bioadhesive. For example, the starch may be present in an amount of 25.5 wt. %, 26.0 wt. %, 26.5 wt. %, 27.0 wt. %, 27.5 wt. %, 28.0 wt. %, 28.5 wt. %, 29.0 wt. %, 29.5 wt. %, 30.0 wt. %, 30.5 wt. %, 31.0 wt. %, 31.5 wt. %, 32.0 wt. %, 32.5 wt. %, 33.0 wt. %, 33.5 wt. %, 34.0 wt. %, 34.5 wt. %, 35.0 wt. %, 35.5 wt. %, 36.0 wt. %, 36.5 wt. %, 37.0 wt. %, 37.5 wt. %, 38.0 wt. %, 38.5 wt. %, 39.0 wt. %, 39.5 wt. %, 40.0 wt. %, 40.5 wt. %, 41.0 wt. %, 41.5 wt. %, 42.0 wt. %, 42.5 wt. %, 43.0 wt. %, 43.5 wt. %, 44.0 wt. %, 44.5 wt. %, or 45.0 wt. %, based on a total weight of the bioadhesive. In some embodiments, a single type of starch may be present in the bioadhesive in an amount of from 1 to 10 wt. %, based on a total weight of bioadhesive. For example, a single type of starch may be present in an amount of 1.0 wt. %, 1.25 wt. %, 1.5 wt. %, 1.75 wt. %, 2.0 wt. %, 2.25 wt. %, 2.5 wt. %, 2.75 wt. %, 3.0 wt. %, 3.25 wt. %, 3.5 wt. %, 3.75 wt. %, 4.0 wt. %, 4.25 wt. %, 4.5 wt. %, 4.75 wt. %, 5.0 wt. %, 5.25 wt. %, 5.5 wt. %, 5.75 wt. %, 6.0 wt. %, 6.25 wt. %, 6.5 wt. %, 6.75 wt. %, 7.0 wt. %, 7.25 wt. %, 7.5 wt. %, 7.75 wt. %, 8.0 wt. %, 8.25 wt. %, 8.5 wt. %, 8.75 wt. %, 9.0 wt. %, 9.25 wt. %, 9.5 wt. %, 9.75 wt. %, or 10.0 wt %, based on a total weight of bioadhesive. In some embodiments, the bioadhesive contains 3.0 wt. % potato starch. In some embodiments, the bioadhesive contains 2.0 wt. % corn starch. In some embodiments, the bioadhesive contains 3.0 wt. % arrowroot starch.

In some embodiments, the starch is present as particles with a mean particle size ranging from 5 to 25 nm. For example, the particles of starch may have a mean particle size of 5 nm, 6 nm, 7 nm, 8 nm, 9 nm, 10 nm, 11 nm, 12 nm, 13 nm, 14 nm, 15 nm, 16 nm, 17 nm, 18 nm, 19 nm, 20 nm, 21 nm, 22 nm, 23 nm, 24 nm, or 25 nm. In some embodiments, the starch is present as particles with a mean particle size of 12 nm.

Latex is a liquid substance created by a plant, typically as protection against damage from sources such as insects. Plant latex is typically a complex mixture that can include proteins, alkaloids, starches, sugars, oils, tannins, resins, gums, and the like. Typically, latex takes the form of an emulsion. Plant latex typically coagulates when exposed to the air and may form a barrier that prevents further damage or fluid loss in response to plant tissue damage. Examples of plant latexes include, but are not limited to, rubber latex, fig tree latex, dandelion latex, pine latex, cactus latex, cassava latex, mangrove latex, *euphorbia* latex, croton latex, poppy latex, hevea latex, guayule latex, mulberry latex, birch latex, *ficus* latex, milkweed latex, cod liver plant latex, milk thistle latex, spurge latex, sapodilla latex, sumac latex, balsam tree latex, mulberry tree latex, tamarind latex, kapok tree latex, acacia latex, chestnut latex, mulberry latex, bamboo latex, acai berry latex, jackfruit latex, and combinations of these. In some embodiments, the plant latex is jackfruit latex.

In some embodiments, the plant latex is present in an amount of 1 to 10 wt. %, based on a total weight of bioadhesive. For example, the plant latex may be present in an amount of 1.0 wt. %, 1.25 wt. %, 1.5 wt. %, 1.75 wt. %, 2.0 wt. %, 2.25 wt. %, 2.5 wt. %, 2.75 wt. %, 3.0 wt. %, 3.25 wt. %, 3.5 wt. %, 3.75 wt. %, 4.0 wt. %, 4.25 wt. %, 4.5 wt. %, 4.75 wt. %, 5.0 wt. %, 5.25 wt. %, 5.5 wt. %, 5.75 wt. %, 6.0 wt. %, 6.25 wt. %, 6.5 wt. %, 6.75 wt. %, 7.0 wt. %, 7.25 wt. %, 7.5 wt. %, 7.75 wt. %, 8.0 wt. %, 8.25 wt. %, 8.5 wt. %, 8.75 wt. %, 9.0 wt. %, 9.25 wt. %, 9.5 wt. %, 9.75 wt. %, or 10.0 wt %, based on a total weight of bioadhesive. In some embodiments, the bioadhesive comprises 3 wt. % jackfruit latex, based on a total weight of bioadhesive.

In some embodiments, the natural gum may include, but is not limited to, guar gum, xanthan gum, arabic gum, karaya gum, tragacanth gum, gum acacia, ghatti gum, locust bean gum, tamarind gum, mesquite gum, sapodilla gum, baobab gum, sago gum, *senna* gum, flaxseed gum, chia seed gum, *psyllium* gum, konjac gum, slime tree gum, dragon's blood gum, maple gum, elm gum, birch gum, pistachio gum, walnut gum, pine gum, gum tree resin, ginger gum, licorice gum, *eucalyptus* gum, and tamarind seed gum. In preferred embodiment, the natural gum is *Acacia arabica* gum.

In some embodiments, the natural gum may be present in the biodhesive in an amount of 1 to 10 wt. %, based on a total weight of bioadhesive. For example, the natural gum may be present in an amount of 1.0 wt. %, 1.25 wt. %, 1.5 wt. %, 1.75 wt. %, 2.0 wt. %, 2.25 wt. %, 2.5 wt. %, 2.75 wt. %, 3.0 wt. %, 3.25 wt. %, 3.5 wt. %, 3.75 wt. %, 4.0 wt. %, 4.25 wt. %, 4.5 wt. %, 4.75 wt. %, 5.0 wt. %, 5.25 wt. %, 5.5 wt. %, 5.75 wt. %, 6.0 wt. %, 6.25 wt. %, 6.5 wt. %, 6.75 wt. %, 7.0 wt. %, 7.25 wt. %, 7.5 wt. %, 7.75 wt. %, 8.0 wt. %, 8.25 wt. %, 8.5 wt. %, 8.75 wt. %, 9.0 wt. %, 9.25 wt. %, 9.5 wt. %, 9.75 wt. %, or 10.0 wt %, based on a total weight of bioadhesive. In some embodiments, the bioadhesive comprises 3 wt. % *Acacia arabica*, based on a total weight of bioadhesive.

As used herein, "hydrogel" refers to a gel in which the swelling agent is water. Hydrogels are typically formed of a polymeric material that absorbs several times its own weight of water. The polymeric component of a hydrogel is typically referred to as "gelling agent". Hydrogel forming materials typically swell when absorbing water. Hydrogels can have a wide range of mechanical properties, for example, hydrogels can have a Young's modulus from about 10 Pa to about 3 MPa. Some hydrogels become slick. Hydrogels are typically classified based on the origin of the gelling agent. Hydrogels having synthetic polymer gelling agents can be referred to as "synthetic hydrogels". Examples of synthetic polymer gelling agents include, but are not limited to polyvinyl alcohol, polyethylene glycol, sodium polyacrylate, and the like. Hydrogels having naturally-derived polymeric gelling agents can be referred to as "natural hydrogels". Naturally-derived polymeric gelling agents typically include polypeptides, polynucleotides, polysaccharides, or combinations of these. When a polymeric gelling agent is derived from a plant, the resulting hydrogel can be referred to as a "plant hydrogel". Some gelling agents derived from plants are referred to as "gum" when not in the form of a hydrogel. In some embodiments, the hydrogels are plant hydrogels. Plant hydrogels help reduce moisture in the glove during wear. Examples of specific naturally-derived polymeric gelling agents include, but are not limited to starch, gelatin, chitin, hyaluronic acid, heparin, fibrin glycosaminoglycans lignin, chitosan, alginate, guar gum, and combinations of these. Some hydrogels, particularly naturally-derived hydrogels, can be identified based on the source of the hydrogel. This may be advantageous when the exact composition of the hydrogel is not known or is complex.

Examples of suitable plant hydrogels include, but are not limited to, aloe vera hydrogel, cactus hydrogel, chia seed hydrogel, flaxseed hydrogel, basil seed hydrogel, fenugreek hydrogel, guar gum hydrogel, tamarind seed hydrogel, *psyllium* husk hydrogel, konjac hydrogel, *cassia* hydrogel, xanthan gum hydrogel, pectin hydrogel, carrageenan hydrogel, agar hydrogel, locust bean gum hydrogel, hibiscus hydrogel, banana hydrogel, potato hydrogel, rice hydrogel, corn hydrogel, wheat hydrogel, barley hydrogel, lotus hydrogel, yam hydrogel, jackfruit seed hydrogel, mango seed hydrogel, passion fruit hydrogel, baobab hydrogel, avocado hydrogel, okra hydrogel, *Moringa* olifera hydrogel, *Nigella sativa* (black cumin seed) hydrogel, and combinations of these. In some embodiments, the plant hydrogel includes okra hydrogel. In some embodiments, the plant hydrogel includes *Moringa* olifera hydrogel. In some embodiments, the plant hydrogel includes okra hydrogel and *Moringa* olifera hydrogel. In some embodiments, the weight ratio of the *Moringa* olifera hydrogel to the okra hydrogel is in the range of 1:5 to 5:1, preferably 1:4 to 4:1, preferably 1:3 to 3:1, preferably 2:1 to 1:2, preferably 1:1.

In some embodiments, the plant hydrogel is present in the bioadhesive in an amount of 1 to 10 wt. %, based on a total weight of bioadhesive. For example, the plant hydrogel may be present in an amount of 1.0 wt. %, 1.25 wt. %, 1.5 wt. %, 1.75 wt. %, 2.0 wt. %, 2.25 wt. %, 2.5 wt. %, 2.75 wt. %, 3.0 wt. %, 3.25 wt. %, 3.5 wt. %, 3.75 wt. %, 4.0 wt. %, 4.25 wt. %, 4.5 wt. %, 4.75 wt. %, 5.0 wt. %, 5.25 wt. %, 5.5 wt. %, 5.75 wt. %, 6.0 wt. %, 6.25 wt. %, 6.5 wt. %, 6.75 wt. %, 7.0 wt. %, 7.25 wt. %, 7.5 wt. %, 7.75 wt. %, 8.0 wt. %, 8.25 wt. %, 8.5 wt. %, 8.75 wt. %, 9.0 wt. %, 9.25 wt. %, 9.5 wt. %, 9.75 wt. %, or 10.0 wt %, based on a total weight of bioadhesive. In some embodiments, the bioadhesive comprises 2 wt. % okra hydrogel and 2 wt. % *Moringa* olifera hydrogel, based on a total weight of bioadhesive.

Glycerin is highly soluble in water. Glycerin may be advantageous to include to control a viscosity of the bioadhesive and/or to enhance a biodegradability of the bioadhesive. The glycerin may also be useful as a plasticizing agent. Glycerin may be derived from a variety of sources, examples of which include, but are not limited to, vegetable glycerin, palm glycerin, coconut glycerin, soy glycerin, corn glycerin, castor oil glycerin, sunflower glycerin, rapeseed glycerin, olive oil glycerin, cottonseed glycerin, palm kernel glycerin, rice bran glycerin, canola glycerin, hemp seed glycerin, aloe vera glycerin, jojoba glycerin, grape seed glycerin, wheat germ glycerin, flaxseed glycerin, sesame glycerin, sunflower seed glycerin, sweet almond glycerin, apricot kernel glycerin, avocado glycerin, coconut palm glycerin, cherry glycerin, mint glycerin, almond oil glycerin, peanut oil glycerin, and various animal sources such as cow, sheep, camel, goat, and the like. In some embodiments, the glycerin is sheep-derived glycerin.

In some embodiments, glycerin is present in the bioadhesive in an amount of 1 to 10 wt. %, based on a total weight of bioadhesive. For example, the glycerin may be present in an amount of 1.0 wt. %, 1.25 wt. %, 1.5 wt. %, 1.75 wt. %, 2.0 wt. %, 2.25 wt. %, 2.5 wt. %, 2.75 wt. %, 3.0 wt. %, 3.25 wt. %, 3.5 wt. %, 3.75 wt. %, 4.0 wt. %, 4.25 wt. %, 4.5 wt. %, 4.75 wt. %, 5.0 wt. %, 5.25 wt. %, 5.5 wt. %, 5.75 wt. %, 6.0 wt. %, 6.25 wt. %, 6.5 wt. %, 6.75 wt. %, 7.0 wt. %, 7.25 wt. %, 7.5 wt. %, 7.75 wt. %, 8.0 wt. %, 8.25 wt. %, 8.5 wt. %, 8.75 wt. %, 9.0 wt. %, 9.25 wt. %, 9.5 wt. %, 9.75 wt. %, or 10.0 wt %, based on a total weight of bioadhesive. In some embodiments, the bioadhesive comprises 5 wt. % sheep-derived glycerin, based on a total weight of bioadhesive.

Preferably, the dye is a naturally-derived and biodegradable dye. That is, the dye is obtained from a source such as a plant, is non-toxic, and can be broken down in the body as part of natural biodegradation of the bioadhesive. Examples of suitable such dyes include, but are not limited to turmeric dye, henna dye, saffron dye, spinach dye, pomegranate dye, onion skin dye, marigold dye, hibiscus dye, coffee dye, tea dye, walnut shell dye, indigo dye, annatto dye, madder root dye, alkanet dye, cochineal dye, brazilwood dye, sandalwood dye, cherry dye, raspberry dye, blackberry dye, red cabbage dye, grape dye, mango dye, carrot dye, orange peel dye, calendula dye, avocado pit dye, *eucalyptus* dye, chamomile dye, beetroot dye, blueberry dye, Nigella *sativa* (black cumin seed) dye, and combinations of these. In preferred embodiment, the dye includes a beetroot dye and a blueberry dye. In some embodiments, the weight ratio of the beetroot dye and the blueberry dye is in the range of 1:5 to 5:1, preferably 1:4 to 4:1, preferably 1:3 to 3:1, preferably 2:1 to 1:2, preferably 1:1.

In some embodiments, the dye may be present in the bioadhesive in an amount of from 1 to 10 wt. %, based on a total weight of bioadhesive. For example, the dye may be present in an amount of 1.0 wt. %, 1.25 wt. %, 1.5 wt. %, 1.75 wt. %, 2.0 wt. %, 2.25 wt. %, 2.5 wt. %, 2.75 wt. %, 3.0 wt. %, 3.25 wt. %, 3.5 wt. %, 3.75 wt. %, 4.0 wt. %, 4.25 wt. %, 4.5 wt. %, 4.75 wt. %, 5.0 wt. %, 5.25 wt. %, 5.5 wt. %, 5.75 wt. %, 6.0 wt. %, 6.25 wt. %, 6.5 wt. %, 6.75 wt. %, 7.0 wt. %, 7.25 wt. %, 7.5 wt. %, 7.75 wt. %, 8.0 wt. %, 8.25 wt. %, 8.5 wt. %, 8.75 wt. %, 9.0 wt. %, 9.25 wt. %, 9.5 wt. %, 9.75 wt. %, or 10.0 wt % based on a total weight of bioadhesive. In some embodiments, the bioadhesive comprises 5 wt. % beetroot dye and 5 wt. % blueberry dye based on a total weight of bioadhesive.

In some embodiments, the dye may be rich in various phytochemicals. Examples of such other chemical components include, but are not limited to saponins, flavonoids, terpenes, cardenolides, steroids, glycosides, and tannins.

Saponins are a class of plant glycosides in which water-soluble sugars are attached to either a lipophilic steroid or triterpenoid. This hydrophobic-hydrophilic asymmetry means that these compounds have the capacity to lower surface tension and are soap-like, similar to surfactants. Examples of saponins are aescin, araloside A, astragaloside, bacopaside, bacosides I-XI, chaconine, charantin, daucosterol, digitonin, esculeoside A, ginsenoside, glycyrrhizin, gypenoside, A-hederin, holothurin, momordin, osladin, protodioscin, pseudoginsenoside, solanine, and ziziphin.

Flavonoids are a group of naturally occurring polyphenolic compounds characterized by the flavan nucleus structure depicted below.

It is worth noting that the phenyl ring labeled "B" in the above image may be connected to either the 2 position as shown or to the 3 position of the "C" ring. Examples of flavonoids include, but are not limited to anthoxanthins, flavans, anthocyanidins (anthocyanins), aurones, and chalcones. Examples of anthoxanthins include flavones such as primuletin, chrysin, tectochrysin, primentin, apigenin, acacetin, genkwanin, echioidinin, baicalein, oroxylon, negletein, norwogonin, wogonin, geraldone, tithonine, luteolin, chrysoeriol, diosmetin, pillion, velutin, norartocarpetin, artocarpetin, scutellarein, hispidulin, sorbifolin, pectolinarigenin, cirsimaritin, mikanin, isocutellarein, zapotinin, zapotin, cerrosillin, alnetin, tricin, corymbosin, nepetin, pedalitin, nordifloretin, jaceosidin, cirsiliol, eupatilin, cirsilineol, eupatorin, sinensetin, hypolaetin, onopordin, wightin, nevadensin, xanthomicrol, tangeretin, serpyllin, sudachitin, acerosin, hymenoxin, nobiletin, and scaposin; flavonols such as 3-hydroxyflavone, azaleatin, fisetin, galangin, gossypetin, isorhamnetin, kaempferide, kaempferol, morin, myricetin, natsudaidain, pachypodol, quercetin, rhamnazinm, and rhamnetin; isoflavones such as daidzein, genistein, and orobol; and neoflavonoids such as dalbergichromene, calophyllolide, coutareagenin, dalbergin, and nivetin. Examples of flavans include, but are not limited to flavanols such as catechin, epiafzelechin, fisetinidol, guibourtinidol, mesquitol, robinetinidol, apiforol, and luteoforol; flavan-3,4-diols such as leucocyanidin, leucodelphinidin, leucofisetinidin, leucomalvidin, leucopelargonidin, leucopeonidin, leucorobinetinidin, melacacidin, and teracacidin; flavanones such as blumeatin, butin, eriodictyol, hesperetin, hesperidin, homoeriodictyol, isosakuranetin, naringenin, naringin, pinocembrin, poncirin, sakuranetin, sakuranin, sterubin, and pinostrobin; and flavanonols such as taxifolin, aromadedrin, and engeletin. Examples of an anthocyanidins include, but are not limited to anthocyanin, aurantinidin, capensinidin, cyanidin, delphinidin, europinidin, hirsutidin, malvidin, pelargonidin, peonidin, petunidin, pulchellidin, rosinidin, apigeninidin, columnidin, diosmetinidin, luteolinidin, tricetinidin, apigeninidin, and guibourtinidin. Examples of aurones include, but are not limited to aurone, 4'-chloro-2-hydroxyaurone, 4'-chlroaurone, aureusidin, sulfuretin (6,3', 4'-trihydroxyaurone), hispidol (6,4'-dihydroxyaurone), and leptosidin. Examples of chalcones include, but are not limited to aurentiacin A, aurentiacin B, 2',6'-dihydroxy-4'-methoxy-3',5'-dimethyldihydrochalcone, rubone, bakuchalcone, dihydrochalcone, lapathinol, lapathone, brackenin, mixtecacin, 2',6'-dihydroxy-4'-methoxydihydrochalcone, isoliquiritin, licuraside, xanthangelols B through E, ponganone I and II, stipulin, 3,3'-dihydroxychalcone, spinochalcone A, spinochalcone B, flemistrictin A, calythropsin, dihydrocalythropsin, pedicin, fissistin, isofissistin, munchiwarin, prorepensin, lonchocarpin, and cardamonin.

Examples of terpenes include, but are not limited to carotenes such as α-carotene, β-carotene, γ-carotene, δ-carotene, ε-carotene, lycopene, neurosporene, phytofluene, and phytoene; and xanthophylls such as canthaxanthin, cryptoxanthin, zeaxanthin, astaxanthin, lutein, rubixanthin.

Examples of cardenolides include, but are not limited to acetyldigitoxins, acetyldigoxins, cymarine, digitoxin, digitoxigenin, digoxigenin, digoxin, medigoxin, neoconvalloside, ouabain, strophanthins, and strophanthidin.

Examples of steroids include, but are not limited to brassinosteroids such as Brassinolide, 28-homobrassinolide, dolicholide, 28-homodolicholide, 28-norbrassinolide, 2-deoxybrassinlide, castasterone,dolichosterone, 2-epicastasterone, 28-nortyphasterol, typhasterol, secasterone, and secasterol, and phytosterols such as β-sitosterol, campesterol, cholesterol, stigmasterol, stigmastanol, ergosterol, lupeol, and cycloartenol.

Glycosides are molecules in which a sugar group is bonded through its anomeric carbon to another group via a glycosidic bond. Glycosides can be linked by an O- (an O-glycoside), N-(a glycosylamine), S-(a thioglycoside), or C- (a C-glycoside) glycosidic bond. A glycosidic bond refers to a bond formed between the hemiacetal or hemiketal group of a saccharide (or a molecule derived from a saccharide) and, in the case of an O-glycosidic bond the oxygen atom of a hydroxyl group of some compound such as an alcohol. In the case of an S-glycosidic bond, the bond is formed with a sulfur atom of a suitable sulfur-containing functional group. In the case of an N-glycosidic bond, the bond is formed with a nitrogen atom of a suitable nitrogen-containing functional group. In the case of a C-glycosidic bond, the bond is formed with a carbon atom. Examples of glycosides include, but are not limited to spinacetin 3-O-β-d-glucopyranosyl(1→6)-[β-d-apiofuranosyl(1→2)]-β-d-glucopyranoside; patuletin 3-O-β-d-(2"feruloylglucopyranosyl)(1→6)-[β-d-apiofuranosyl(1→2)]-β-d-glucopyranoside; spinacetin 3-O-β-d-(2"-p-coumaroylglucopyranosyl)(1→6)-[β-d-apiofuranosyl(1→2)]-β-d-glucopyranoside; spinacetin 3-O-β-d-(2"feruloylglucopyranosyl)(1→6)-[β-d-apiofuranosyl(1→2)]-β-d-glucopyranoside; spinacetin 3-O-β-d-(2"feruloylglucopyranosyl)(1→6)-β-d-glucopyranoside; jaceidin 4'-glucuronide; 5,3',4'-trihydroxy-3-methoxy-6:7-methylenedioxyflavone 4'-glucuronide; 5,4'-dihydroxy-3,3'-dimethoxy-6:7-methylenedioxyflavone 4'-glucuronide; patuletin 3-glucosyl(1→6)-[apiosyl(1→2)] glucoside; and patuletin and spinacetin 3-gentiobiosides.

Tannins are water-soluble polyphenols, typically having molecular weights of 500 to 20,000 Da. Typically, tannins are formed from repeat units of gallic acid or flavan-3-ol. Examples of tannins include, but are not limited to, ellagitannins tannins such as punicalagins, castalagins, vescalagins, castalins, casuarictins, grandinins, punicalins, roburin As, tellimagrandin IIs, and terflavin Bs; and gallotannins such as digalloyl glucose and 1,3,6-trigalloyl glucose.

In some embodiments, the dye is substantially free of saponins, terpenes, cardenolides, steroids, glycosides, and tannins. Such components may be removed from the dye using any suitable technique known to one in the art. For example, a suitable dye source plant may be treated with a solvent to extract one or more of the saponins, flavonoids, terpenes, cardenolides, steroids, glycosides, and tannins.

In some embodiments, the bioadhesive has an anthocyanin content ranging from 75 to 135 mg per 100 g of bioadhesive. For example, the bioadhesive may include 75 mg, 80 mg, 85 mg, 90 mg, 95 mg, 100 mg, 105 mg, 110 mg, 115 mg, 120 mg, 125 mg, 130 mg, or 135 mg anthocyanin per 100 g of bioadhesive.

In general, the bone powder can be a powdered form of a bone derived from a suitable animal source. Examples of suitable such animal sources for the bone include, but are not limited to cow, chicken, fish, sheep, goat, pig, horse, deer, rabbit, duck, turkey, bison, elk, kangaroo, camel, ostrich, quail, buffalo, antelope, reindeer, moose, boar, pigeon, goose, llama, alpaca, squirrel, and combinations of these. In some embodiment, the bone powder is cow bonemeal powder.

In general, the bone powder can be formed by grinding or milling a bone from a suitable animal source. The bone may be dried and/or cooked prior to milling. In general, the grinding or milling may be performed by any suitable technique or with any suitable equipment known to one of ordinary skill in the art. Examples of such techniques include, but are not limited to, grinding, ball milling, chopping, pulverizing, crushing, pounding, mincing, shredding, smashing, and fragmenting. In some embodiments, the milling may take place using a mill, ball mill, rod mill, autogenous mill, cutting mill, semi-autogenous grinding mill, pebble mill, buhrstone mill, burr mill, tower mill, vertical shaft impactor mill, a low energy milling machine, grinder, pulverizer, mortar and pestle, blender, crusher, or other implement used to reduce a material to small particles.

In some embodiments, the bone powder is in the form of particles having a mean particle size of 5 to 500 μm. For example, the bone powder particles may have a mean particle size of 5 μm, 10 μm, 15 μm, 20 μm, 25 μm, 30 μm, 35 μm, 40 μm, 45 μm, 50 μm, 55 μm, 60 μm, 65 μm, 70 μm, 75 μm, 80 μm, 85 μm, 90 μm, 95 μm, 100 μm, 105 μm, 110 μm, 115 μm, 120 μm, 125 μm, 130 μm, 135 μm, 140 μm, 145 μm, 150 μm, 155 μm, 160 μm, 165 μm, 170 μm, 175 μm, 180 μm, 185 μm, 190 μm, 195 μm, 200 μm, 225 μm, 250 μm, 275 μm, 300 μm, 325 μm, 350 μm, 375 μm, 400 μm, 425 μm, 450 μm, 475 μm, or 500 μm.

In some embodiments, the bone powder may be present in the bioadhesive in an amount of from 1 to 25 wt. %, based on a total weight of bioadhesive. For example, the bone powder may be present in an amount of 1.0 wt. %, 1.5 wt. %, 2.0 wt. %, 2.5 wt. %, 3.0 wt. %, 3.5 wt. %, 4.0 wt. %, 4.5 wt. %, 5.0 wt. %, 5.5 wt. %, 6.0 wt. %, 6.5 wt. %, 7.0 wt. %, 7.5 wt. %, 8.0 wt. %, 8.5 wt. %, 9.0 wt. %, 9.5 wt. %, 10.0 wt. %, 10.5 wt. %, 11.0 wt. %, 11.5 wt. %, 12.0 wt. %, 12.5 wt. %, 13.0 wt. %, 13.5 wt. %, 14.0 wt. %, 14.5 wt. %, 15.0 wt. %, 15.5 wt. %, 16.0 wt. %, 16.5 wt. %, 17.0 wt. %, 17.5 wt. %, 18.0 wt. %, 18.5 wt. %, 19.0 wt. %, 19.5 wt. %, 20.0 wt. %, 20.5 wt. %, 21.0 wt. %, 21.5 wt. %, 22.0 wt. %, 22.5 wt. %, 23.0 wt. %, 23.5 wt. %, 24.0 wt. %, 24.5 wt. %, or 25 wt. %, based on a total weight of bioadhesive.

In some embodiments, the organic solvent may include, but is not limited to, methanol, acetone, isopropanol, chloroform, hexane, toluene, benzene, diethyl ether, dichloromethane, ethyl acetate, acetonitrile, butanol, propanol, dimethyl sulfoxide (DMSO), tetrahydrofuran (THF), dimethylformamide (DMF), methylene chloride, xylene, cyclohexane, pyridine, acetic acid, methyl ethyl ketone (MEK), methyl isobutyl ketone (MIBK), n-hexane, 1,4-dioxane, formamide, benzyl alcohol, phenol, and chloroform. In some embodiment, the organic solvent is ethanol.

In some embodiments, the organic solvent may be present in the bioadhesive in an amount of from 0.01 to 5 wt. %, based on a total weight of bioadhesive. For example, the organic solvent may be present in an amount of 0.01 wt. %, 0.05 wt. %, 0.10 wt. %, 0.15 wt. %, 0.20 wt. %, 0.25 wt. %, 0.30 wt. %, 0.35 wt. %, 0.40 wt. %, 0.45 wt. %, 0.50 wt. %, 0.55 wt. %, 0.60 wt. %, 0.65 wt. %, 0.70 wt. %, 0.75 wt. %, 0.80 wt. %, 0.85 wt. %, 0.90 wt. %, 0.95 wt. %, 1.00 wt. %, 1.05 wt. %, 1.10 wt. %, 1.15 wt. %, 1.20 wt. %, 1.25 wt. %, 1.30 wt. %, 1.35 wt. %, 1.40 wt. %, 1.45 wt. %, 1.50 wt. %, 1.55 wt. %, 1.60 wt. %, 1.65 wt. %, 1.70 wt. %, 1.75 wt. %, 1.80 wt. %, 1.85 wt. %, 1.90 wt. %, 1.95 wt. %, 2.00 wt. %, 2.10 wt. %, 2.20 wt. % 2.30 wt. %, 2.40 wt. %, 2.50 wt. %, 2.60 wt. %, 2.70 wt. %, 2.80 wt. %, 2.90 wt. %, 3.00 wt. %, 3.10 wt. %, 3.20 wt. % 3.30 wt. %, 3.40 wt. %, 3.50 wt. %, 3.60 wt. %, 3.70 wt. %, 3.80 wt. %, 3.90 wt. %, 4.00 wt. %, 4.10 wt. %, 4.20 wt. % 4.30 wt. %, 4.40 wt. %, 4.50 wt. %, 4.60 wt. %, 4.70 wt. %, 4.80 wt. %, 4.90 wt. %, or 5.00 wt. %, based on a total weight of bioadhesive. In some embodiments, the bioadhesive comprises 1.0 wt. % ethanol, based on a total weight of bioadhesive.

In some embodiments, the bioadhesive has a viscosity ranging from 15 to 35 cSt. For example, the bioadhesive may have a viscosity of 15.0 cSt, 15.5 cSt, 16.0 cSt, 16.5 cSt, 17.0 cSt, 17.5 cSt, 18.0 cSt, 18.5 cSt, 19.0 cSt, 19.5 cSt, 20.0 cSt, 20.5 cSt, 21.0 cSt, 21.5 cSt, 22.0 cSt, 22.5 cSt, 23.0 cSt, 23.5 cSt, 24.0 cSt, 24.5 cSt, 25.0 cSt, 25.5 cSt, 26.0 cSt, 26.5 cSt, 27.0 cSt, 27.5 cSt, 28.0 cSt, 28.5 cSt, 29.0 cSt, 29.5 cSt, 30.0 cSt, 30.5 cSt, 31.0 cSt, 31.5 cSt, 32.0 cSt, 32.5 cSt, 33.0 cSt, 33.5 cSt, 34.0 cSt, 34.5 cSt, or 35.0 cSt.

In some embodiments, the bioadhesive has a pH ranging from 7.25 to 8.75. For example, the bioadhesive may have a pH of 7.25, 7.30, 7.35, 7.40, 7.45, 7.50, 7.55, 7.60, 7.65, 7.70, 7.75, 7.80, 7.85, 7.90, 7.95, 8.00, 8.05, 8.10, 8.15, 8.20, 8.25, 8.30, 8.35, 8.40, 8.45, 8.50, 8.55, 8.60, 8.65, 8.70, or 8.75. In some embodiments, the bioadhesive has a pH of 7.9.

Figure 1:
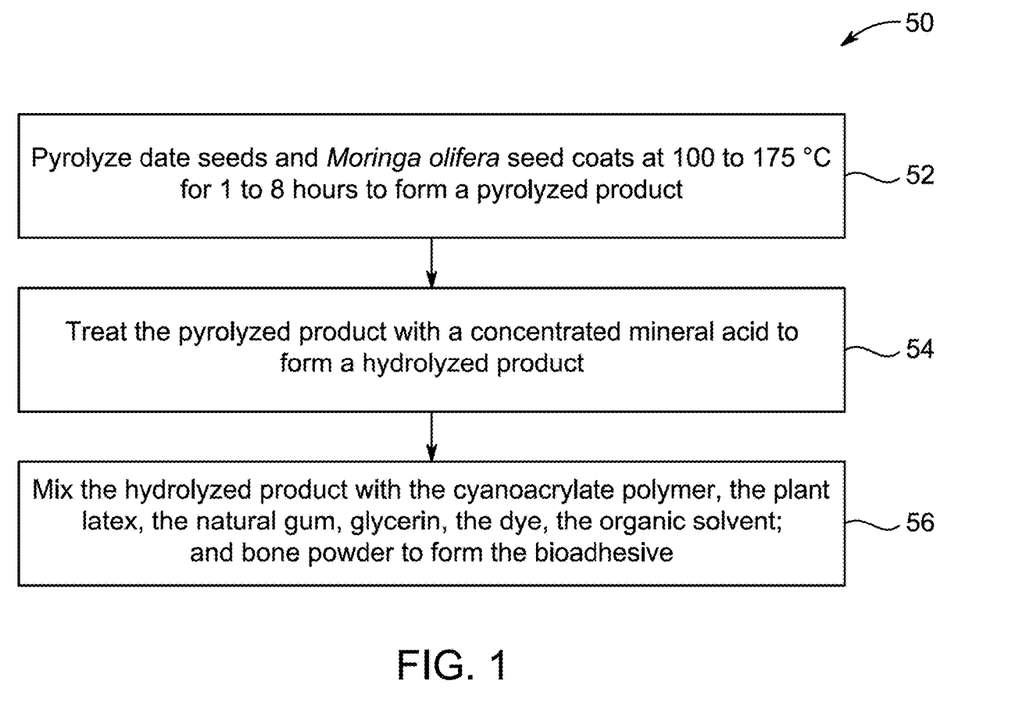
FIG. 1 is an exemplary flow chart of a method of preparing a bioadhesive, according to certain embodiments.

FIG. 1 illustrates a schematic flow chart of a method 50 of forming the bioadhesive. The order in which the method 50 is described is not intended to be construed as a limitation, and any number of the described method steps can be combined to implement the method 50. Additionally, individual steps may be removed or skipped from the method 50 without departing from the spirit and scope of the present disclosure.

At step 52, the method 50 includes pyrolyzing date seeds and *Moringa* olifera seed coats to form a pyrolyzed product. In some embodiments, pyrolyzing date seeds and *Moringa oleifera* seeds may be conducted at a temperature in a range range of 100 to 175° C. For example, the pyrolyzing can be performed at 100° C., 105° C., 110° C., 115° C., 120° C., 125° C., 130° C., 135° C., 140° C., 145° C., 150° C., 155° C., 160° C., 165° C., 170° C., or 175° C. In some embodiments, the pyrolyzing date seeds and *Moringa oleifera* seeds is carried out at 136° C. In some embodiments, the pyrolyzing can be performed for 1 to 8 hours. For example, the pyrolyzing can be performed for 1 hour, 1.25 hours, 1.5 hours, 1.75 hours, 2.0 hours, 2.25 hours, 2.5 hours, 2.75 hours, 3.0 hours, 3.25 hours, 3.5 hours, 3.75 hours, 4.0 hours, 4.25 hours, 4.5 hours, 4.75 hours, 5.0 hours, 5.25 hours, 5.5 hours, 5.75 hours, 6.0 hours, 6.25 hours, 6.5 hours, 6.75 hours, 7.0 hours, 7.25 hours, 7.5 hours, 7.75 hours, or 8.0 hours. In some embodiments, the pyrolyzing is performed for 4 hours.

At step 54, the method 50 includes treating the pyrolyzed product with a concentrated mineral acid to form a hydrolyzed product. Examples of suitable concentrated mineral acids which can be used include, but are not limited to, sulfuric acid ($H_2SO_4$), nitric acid ($HNO_3$), phosphoric acid ($H_3PO_4$), hydrofluoric acid (HF), perchloric acid ($HClO_4$), hydrobromic acid (HBr), hydroiodic acid (HI), chromic acid ($H_2CrO_4$), boric acid ($H_3BO_3$), periodic acid ($HIO_4$), selenic acid ($H_2SeO_4$), telluric acid ($H_6TeO_6$), sulfurous acid ($H_2SO_3$), nitrous acid ($HNO_2$), hypochlorous acid (HClO), chloric acid ($HClO_3$), iodic acid ($HIO_3$), bromic acid ($HBrO_3$), fluorosilicic acid ($H_2SiF_6$), carbonic acid ($H_2CO_3$), arsenic acid ($H_3AsO_4$), antimonic acid ($HSbO_3$), tungstic acid ($H_2WO_4$), vanadic acid ($H_3VO_4$), manganic acid ($H_2MnO_4$), pyrophosphoric acid ($H_4P_2O_7$), metaphosphoric acid ($HPO_3$), formic acid (HCOOH), and acetic acid ($CH_3COOH$). In some embodiments, the concentrated mineral acid is concentrated HCl. In some embodiments, the concentration of the HCl is about 80 to 90%. In some embodiments, HCl concentration can be, for example, 80%, 81%, 82%, 83%, 84%, 85%, 86%, 87%, 88%, 89%, or 90%. In some embodiments, the HCl concentration may be about 89%.

At step 56, the method 50 includes mixing the hydrolyzed product with the cyanoacrylate polymer, the plant latex, the natural gum, glycerin, the dye, the organic solvent; and bone powder to form the bioadhesive. Each of the individual components of the bioadhesive are mixed together in the above-described weight percentages to form the bioadhesive.

A method of repairing a tissue is described. In general, the tissue can be any suitable type of tissue, such as skin, fat, cartilage, nerve, blood vessels, tendons, ligaments, cartilage, epithelial tissue, connective tissue, lymphatic tissue, adipose tissue, endothelial tissue, heart tissue, liver tissue, kidney tissue, spleen tissue, pancreas tissue, brain tissue, spinal cord tissue, lung tissue, ocular tissue, digestive tissue, thymus tissue, reproductive tissue, lymphoid tissue, bone marrow tissue, epidermal tissue, dermal tissue, oral tissue, and renal tissue. In some embodiments, the tissue is at least one selected from bone and muscle.

The method includes applying the bioadhesive to a wound in the tissue. Examples of wounds include, but are not limited to a burn, a blister, a scrape, an abrasion, a puncture, a laceration, an incision, an ulcer, a surgical wound, a pressure sore, a diabetic wound, a contusion, a sprain, a strain, a bruise, a stab wound, a bite wound, a gunshot wound, a gunpowder burn, a frostbite, a chemical burn, a thermal burn, a radiation burn, a poison ivy rash, a sunburn, a corneal abrasion, a venous ulcer, an arterial ulcer, a chronic wound, and a post-surgical wound. In some embodiments, the wound is at least one selected from a cut, a tear, and a fracture.

Figure 3A:
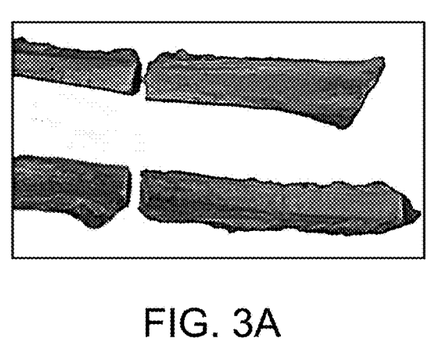
FIG. 3A is an optical image of a fractured sheep rib bone, according to certain embodiments.
Figure 3B:
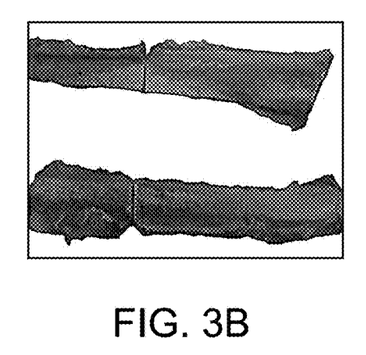
FIG. 3B is an optical image of the fractured sheep rib bone joined using the bioadhesive, according to certain embodiments.
Figure 3C:
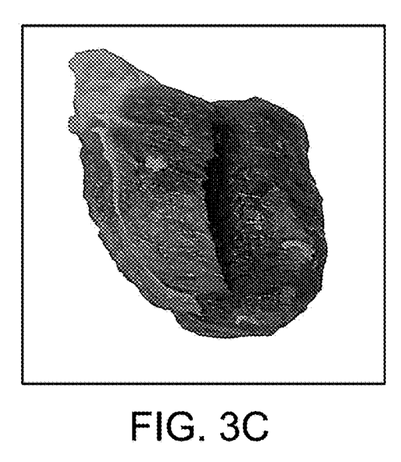
FIG. 3C is an optical image of a cracked muscle tissue, according to certain embodiments.
Figure 3D:
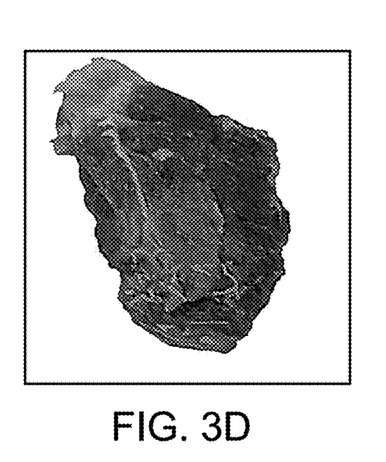
FIG. 3D is an optical image of the cracked muscle tissue repaired using the bioadhesive, according to certain embodiments.

In some embodiments, the wound is a fractured bone (see FIG. 3A). An optical image of the fractured rib bone joined using the bioadhesive is depicted in FIG. 3B. In some embodiments, the wound is a cracked muscle tissue (FIG. 3C). The cracked muscle tissue is repaired by applying the bioadhesive as depicted in FIG. 3D.

Examples

The following examples demonstrate a bioadhesive and a method of forming thereof. The examples are provided solely for illustration and are not to be construed as limitations of the present disclosure, as many variations thereof are possible without departing from the spirit and scope of the present disclosure.

Example 1: Materials

A biobased nanocomposite adhesive formulation was investigated. The composition was derived from organic sources such as, nano starch obtained from date seed and potato peel, starch derived from moringa seeds glue, a combination of root beet dye, blueberry pigment, and black cumin seed pigments, adhesive substances include okra gel, jackfruit latex, natural glue, and beef bonemeal powder treated as collagen protein and minerals, sheep gut based glycerin, and acrylate polymer.

Figure 2A:
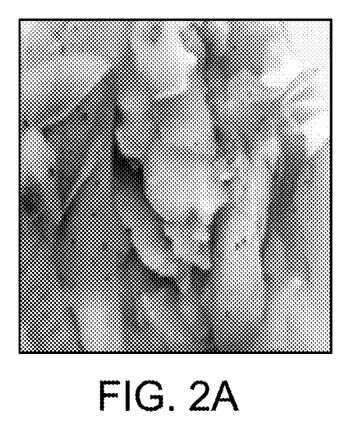
FIG. 2A is an optical image of potato peel, according to certain embodiments.
Figure 2B:
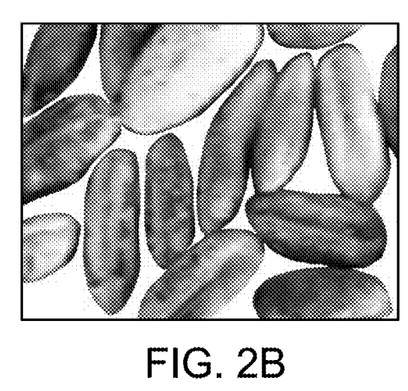
FIG. 2B is an optical image of date seeds, according to certain embodiments.
Figure 2C:
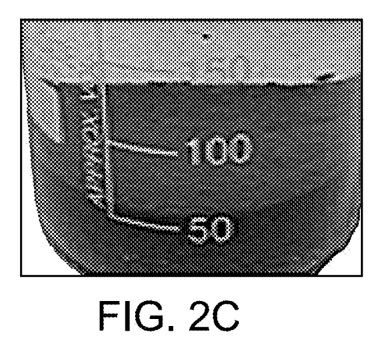
FIG. 2C an optical image of a solution obtained on acid hydrolysis of the date seeds, according to certain embodiments.
Figure 2D:
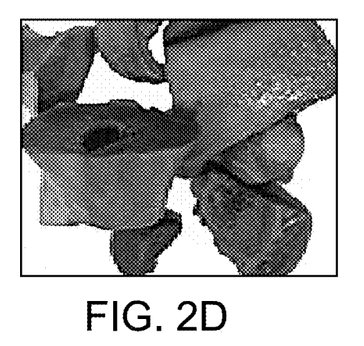
FIG. 2D is an optical image of beef bone and acid hydrolysis, according to certain embodiments.
Figure 2E:
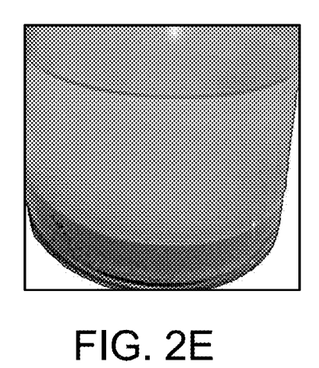
FIG. 2E is an optical image of a solution of beef bone nanoparticles, according to certain embodiments.
Figure 2F:
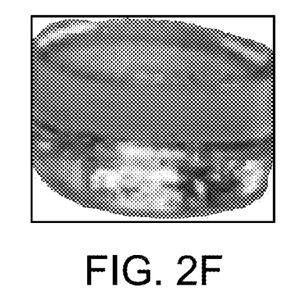
FIG. 2F is an optical image of sheep gut glycerin, according to certain embodiments.
Figure 2G:
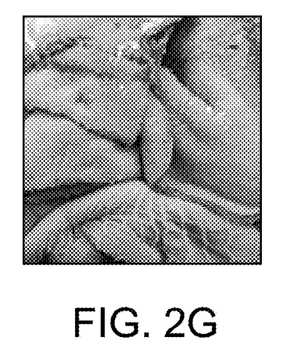
FIG. 2G is an optical image of sheep gut, according to certain embodiments.
Figure 2H:
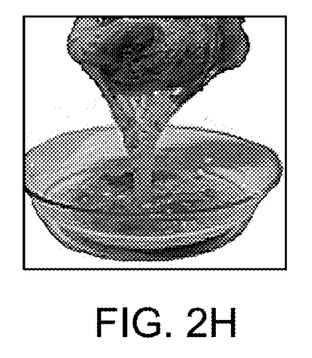
FIG. 2H is an optical image of okra gel, according to certain embodiments.
Figure 2I:
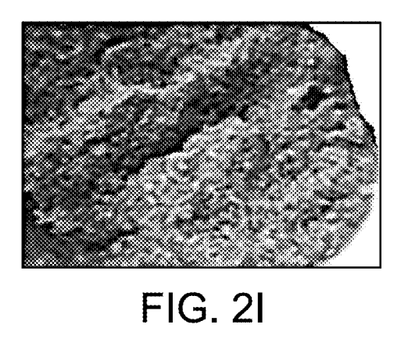
FIG. 2I is an optical image of crushed moringa seed, according to certain embodiments.
Figure 2J:
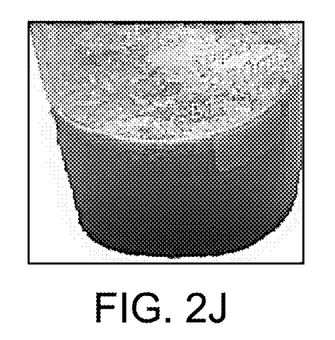
FIG. 2J is an optical image of moringa seed gel, according to certain embodiments.
Figure 2K:
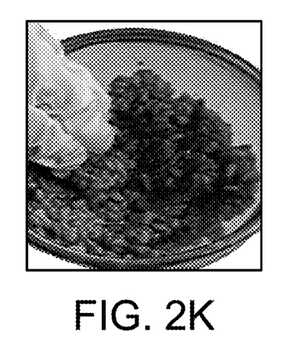
FIG. 2K is an optical image of soaked moringa seeds, according to certain embodiments.
Figure 2L:
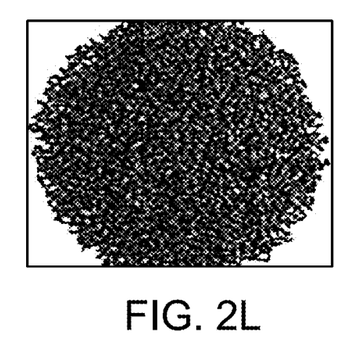
FIG. 2L is an optical image of organic black seed, according to certain embodiments.
Figure 2M:
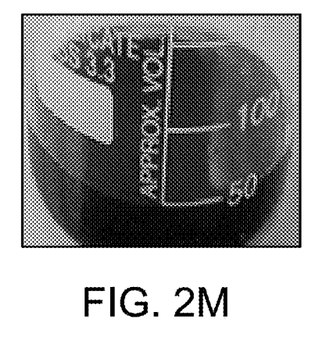
FIG. 2M is an optical image of organic dye, according to certain embodiments.
Figure 2N:
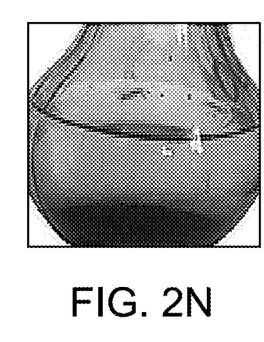
FIG. 2N is an optical image of moringa nanoparticles, according to certain embodiments.
Figure 2O:
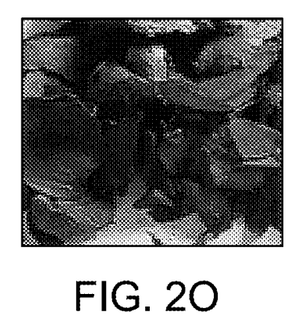
FIG. 2O is an optical image of beetroots, according to certain embodiments.
Figure 2P:
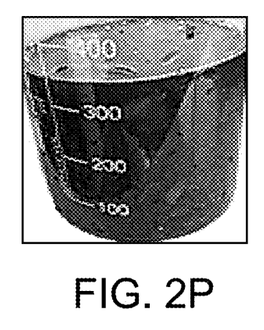
FIG. 2P is an optical image of beetroot dye, according to certain embodiments.
Figure 2Q:
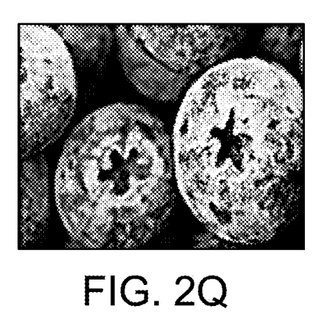
FIG. 2Q is an optical image of blueberries, according to certain embodiments.
Figure 2R:
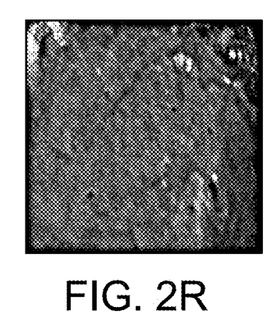
FIG. 2R is an optical image of the bioadhesive, according to certain embodiments.

The preparation method included pyrolysis of date seed and moringa seed coat starch. The pyrolysis was conducted in an oven at 136° C. for 4.0 hours (h). Acid hydrolysis with 89 wt. % hydrochloric acid (HCl) was utilized to convert the micro particles of moringa seed coat and date seed starch into nanoparticles. In one implementation of the present disclosure, the bioadhesive incorporated 5 wt. % of cyanoacrylate adhesive, 3 wt. % potato peel starch, 2 wt. % corn starch, 3 wt. % arrow root powder, and a mixture of organic substances. The bioadhesive further included 2 wt. % waste okra gel, 2 wt. % moringa gel, 1 wt. % natural gum, 3 wt. % jackfruit latex, 3 wt. % acacia *arabica* glue, 2 wt. % black cumin seed, 4 wt. % moringa seed gel, 1 wt. % ethyl alcohol, and 5 wt. % sheep gut oil-based glycerin. In addition, 5 wt. % beetroot peel pigment and 5 wt. % waste blueberry pigment were included as modified organic substances, as shown in FIGS. 2A-2R. The resulting bioadhesive exhibited a nanoparticle size of 12 nm.

Example 2: Bioadhesive Characterization

Results obtained from the characterization of the bioadhesive showed that the viscosity was found standard when compared with the synthetic wound surgery adhesive provided by American society for testing and materials (ASTM D5083), indicating effective performance in comparison to synthetic wound surgery adhesives. The results further followed additional standards, including ASTM D500 and ASTM D2925. Further, the parameters such as pH, anthocyanin as an antioxidant, and starch concentration were analyzed, yielding desirable outcomes when compared to synthetic wound adhesive biomaterials, measured under laboratory conditions in accordance with ASTM standardization protocols.

Further, Table 1 lists the results of pH determination, antioxidant, and starch in the samples. Table 2 lists scanning electron microscopy (SEM) results of nano starch measurement. Table 3 lists the results of odor test according to the ASTM D3801. Table 4 lists the results of the chemical element test. Table 5 lists effects of the bioadhesive prepared from organic components and the results were compared to the synthetic materials used in the market on wound adhesive.

TABLE 1

Determination of pH, antioxidant, and starch in the samples [Mean ± SE (standard Error, n = 3)]

| Materials | pH determination | Starch determination | Anthocyanine as antioxidant (mg/100 g) |
|---|---|---|---|
| Bioadhesive | 7.9 ± 0.03 | 35.0% ± 0.1 | 105 |
| Synthetic adhesive | Alkaline ≥ 7 | Zero from gas or oil and 10% to 40% for starch sample | 0 |

TABLE 2

Measurement of nano starch by scanning electron microscopy (SEM).

| Materials | Nano starch size |
|---|---|
| Bioadhesive | 12 nm |
| Synthetic adhesive | 1 nm to 100 nm (Standard) |

TABLE 3

Odor test according to the ASTM D3801.

| Materials | Moisture percent | Viscosity (cSt) | Odor |
|---|---|---|---|
| Bioadhesive | 35 | 25 | Low odor |
| Synthetic adhesive By ASTM D3801 | Maximum 40% | 15-30 | Low odor |

TABLE 4

Determination of chemical element test by EN166 [Mean ± SE (n = 3)]

| Chemical Element | Bioadhesive parts per million (ppm) | Synthetic Material (ppm) |
|---|---|---|
| K | 9.0 ± 0.2b | 10 |
| Na | 4.3 ± 0.4bc | 5 |
| Cl | 0.57 ± 0.01d | 2 |
| $CO_3^{2-}$ | 145 ± 1.1a | 440-5 |
| Ca | 10.0 ± 0.12a | 10 |
| Si | 3.6 | 5 |
| Fe | 1.8 | 5 |
| Cu | 0.32 | 5 |
| Al | 1.2 | 5 |
| Zn | 3.4 | 5 |
| Ni | 0.01 | 5 |
| Mg | 2 | 5 |
| P | 9.5 | 10 |
| Mn | 3 | 5 |

The chemical element test for Ca (calcium), K (potassium), P (phosphorus), $CO_3^{2-}$ (carbonate), Cl (chlorine), Na (sodium), Si (silicon), Fe (Iron), Cu (copper), Al (aluminum), Mg (magnesium), Mn (manganese), Ni (nickel), and Zn (zinc) were determined using the EN (166) [European Norm, 166] standardization. The results, as listed in Table 4, were desirable, when compared to synthetic wound or injury adhesive materials. All the elements showed values within the standard limits.

TABLE 5

Effects of the bioadhesive and synthetic materials on wound adhesive properties.

| Sample | Hours started for fitting fracture | Percent joined |
|---|---|---|
| Bioadhesive | 1.5 ± 0.1 | 100 ± 0.3 |
| Organic nanocomposite adhesive | 1.0 ± 0.2 | 100 ± 0.2 |

The aspects of the present disclosure provide the bioadhesive and the method of production thereof. In particular, the bioadhesive is formulated using date seed-based nano starch in combination with moringa-based *Moringa oleifera* nano starch, which are processed through bioprocess technology, pyrolysis, and the incorporation of organic dyes and substances. Further, starch-bearing nanocomposites derived from date seeds, *Moringa oleifera*, moringa seed coat-based starch, and moringa seed kernel gel were used as components to produce the bioadhesive for wound surgical glue applications in medical and dental fields.

Numerous modifications and variations of the present disclosure are possible in light of the above teachings. It is, therefore, to be understood that within the scope of the appended claims, the invention may be practiced otherwise than as specifically described herein.

The invention claimed is:
1. A bioadhesive, comprising
a cyanoacrylate polymer;
a starch comprising *Moringa* olifera starch and acid hydrolyzed date seed starch;
a plant latex;
a natural gum;
a plant hydrogel;
glycerin;
a dye;
an organic solvent; and
bone powder.

2. The bioadhesive of claim 1, wherein the starch further comprises at least one selected from the group consisting of potato starch, corn starch, and arrowroot starch.

3. The bioadhesive of claim 1, wherein the starch further comprises potato starch, corn starch, and arrowroot starch.

4. The bioadhesive of claim 1, wherein the plant hydrogel comprises okra hydrogel and *Moringa olifera* hydrogel.

5. The bioadhesive of claim 1, wherein the dye comprises beetroot dye and blueberry dye.

6. The bioadhesive of claim 1, wherein the bone powder is beef bonemeal powder.

7. The bioadhesive of claim 1, wherein the glycerin is sheep-derived glycerin.

8. The bioadhesive of claim 1, wherein the plant latex is jackfruit latex.

9. The bioadhesive of claim 1, wherein the organic solvent is ethanol.

10. The bioadhesive of claim 1, wherein the natural gum is *Acacia arabica* gum.

11. The bioadhesive of claim 1, wherein the starch is present in an amount of 25 to 45 wt. % based on a total weight of bioadhesive.

12. The bioadhesive of claim 1, wherein the starch is present as particles having a mean particle size of 5 to 25 nm.

13. The bioadhesive of claim 1, having
a viscosity of 15 to 35 cSt; and
a pH of 7.25 to 8.75.

14. The bioadhesive of claim 1, having an anthocyanine content of 75 to 135 mg per 100 g of bioadhesive.

15. A method of repairing a tissue, the method comprising applying to a wound in the tissue the bioadhesive of claim 1.

16. The method of claim 15, wherein the wound is at least one selected from a cut, a tear, and a fracture.

17. The method of claim 15, wherein the tissue is at least one selected from bone and muscle.

* * * * *